US009031727B2

(12) United States Patent
Miyazaki et al.

(10) Patent No.: US 9,031,727 B2
(45) Date of Patent: May 12, 2015

(54) VEHICLE TRAVEL CONTROL APPARATUS

(71) Applicants: Terufumi Miyazaki, Toyota (JP); Yukihiko Ideshio, Nisshin (JP); Toshihiko Kamiya, Toyota (JP); Shingo Eto, Gamagori (JP); Hironori Asaoka, Nisshin (JP); Yasuyuki Kato, Toyota (JP)

(72) Inventors: Terufumi Miyazaki, Toyota (JP); Yukihiko Ideshio, Nisshin (JP); Toshihiko Kamiya, Toyota (JP); Shingo Eto, Gamagori (JP); Hironori Asaoka, Nisshin (JP); Yasuyuki Kato, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/186,892

(22) Filed: Feb. 21, 2014

(65) Prior Publication Data
US 2014/0172217 A1 Jun. 19, 2014

Related U.S. Application Data

(63) Continuation-in-part of application No. PCT/JP2011/069093, filed on Aug. 24, 2011.

(51) Int. Cl.
*B60W 20/00* (2006.01)
*B60K 6/48* (2007.10)
(Continued)

(52) U.S. Cl.
CPC ............... *B60W 20/108* (2013.01); *B60K 6/48* (2013.01); *F02D 29/02* (2013.01); *Y02T 10/48* (2013.01); *F02N 11/0837* (2013.01);
(Continued)

(58) Field of Classification Search
CPC ............ B60W 2520/16; B60W 2540/04; B60W 2540/103; B60W 2540/106; B60W 2540/30; B60W 2710/021; B60W 2710/024; B60W 2710/027; B60W 2710/0622; B60W 2710/0677; B60T 13/586; B60T 13/745; B60T 17/18; B60T 2201/02; B60T 2220/02; B60T 2260/08; B60T 2270/402; B60T 2270/611; B60T 7/12; B60T 7/122; B60T 7/22; B60T 8/00
USPC .................. 701/22, 70, 54, 93, 96, 110, 112; 903/902, 919, 947, 951, 960
See application file for complete search history.

(56) References Cited

U.S. PATENT DOCUMENTS 5,915,801 A 6/1999 Taga et al.
6,805,211 B2 * 10/2004 Fujikawa .................. 180/65.25
(Continued)

FOREIGN PATENT DOCUMENTS

DE  102 21 701 A1  11/2002
DE  10 2009 028 242 A1  2/2011
(Continued)

*Primary Examiner* — John R Olszewski
*Assistant Examiner* — Truc M Do
(74) *Attorney, Agent, or Firm* — Oblon, McClelland, Maier & Neustadt, L.L.P.

(57) ABSTRACT

A vehicle running control device in a vehicle includes a power connecting/disconnecting device interrupting power transmission between an engine and drive wheels, the vehicle running control device providing free-run control of interrupting the power transmission with the power connecting/disconnecting device and stopping the engine during inertia running, the vehicle running control device being configured to determine a target vehicle deceleration at the start of the free-run control based on a vehicle speed and to estimate an estimated vehicle deceleration when the free-run control is started, before starting the free-run control, and when the estimated vehicle deceleration is closer to the target vehicle deceleration at the start of the free-run control, the free-run control being more easily provided.

7 Claims, 7 Drawing Sheets

(51) Int. Cl.
- *F02D 29/02* (2006.01)
- *F02N 11/08* (2006.01)
- *B60W 50/00* (2006.01)
- *B60W 30/18* (2012.01)
- *B60K 6/445* (2007.10)
- *B60W 10/18* (2012.01)
- *F16D 48/02* (2006.01)
- *B60W 10/02* (2006.01)
- *B60W 10/06* (2006.01)
- *B60W 10/08* (2006.01)

(52) U.S. Cl.
CPC .... *B60W 50/0097* (2013.01); *B60W 30/18072* (2013.01); *B60K 2006/4825* (2013.01); *B60W 2030/1809* (2013.01); *B60W 2520/105* (2013.01); *B60K 6/445* (2013.01); *B60W 10/18* (2013.01); *B60W 20/00* (2013.01); *F16D 48/02* (2013.01); *B60W 10/02* (2013.01); *B60W 10/06* (2013.01); *B60W 10/08* (2013.01); *Y10S 903/93* (2013.01); *Y02T 10/6221* (2013.01); *Y02T 10/6252* (2013.01); *Y02T 10/84* (2013.01); *Y10S 903/902* (2013.01); *Y10S 903/919* (2013.01); *Y10S 903/947* (2013.01); *Y10S 903/951* (2013.01); *Y10S 903/96* (2013.01)

(56) References Cited

U.S. PATENT DOCUMENTS

| | | | |
|---|---|---|---|
| 6,840,341 B2 * | 1/2005 | Fujikawa | 180/65.25 |
| 6,915,782 B2 * | 7/2005 | Hanada et al. | 123/399 |
| 7,099,757 B2 * | 8/2006 | Niki et al. | 701/22 |
| 2001/0018384 A1 | 8/2001 | Onimaru et al. | |
| 2003/0029653 A1 * | 2/2003 | Fujikawa | 180/65.2 |
| 2003/0045394 A1 | 3/2003 | Kurabayashi | |
| 2003/0062206 A1 * | 4/2003 | Fujikawa | 180/65.2 |
| 2003/0184152 A1 | 10/2003 | Cikanek et al. | |
| 2004/0129470 A1 * | 7/2004 | Huelser et al. | 180/170 |
| 2004/0254039 A1 * | 12/2004 | Yasui et al. | 475/5 |
| 2005/0003926 A1 * | 1/2005 | Hanada et al. | 477/3 |
| 2005/0124458 A1 * | 6/2005 | Iwatsuki et al. | 477/34 |
| 2005/0125134 A1 * | 6/2005 | Iwatsuki et al. | 701/70 |
| 2005/0125137 A1 * | 6/2005 | Shiiba et al. | 701/96 |
| 2005/0267665 A1 * | 12/2005 | Iwatsuki et al. | 701/70 |
| 2006/0060399 A1 * | 3/2006 | Tabata et al. | 180/65.2 |
| 2006/0064225 A1 * | 3/2006 | Tabata et al. | 701/96 |
| 2006/0108163 A1 * | 5/2006 | Kitano et al. | 180/65.2 |
| 2006/0113129 A1 * | 6/2006 | Tabata | 180/65.2 |
| 2006/0287798 A1 * | 12/2006 | Inoue et al. | 701/70 |
| 2007/0255476 A1 * | 11/2007 | Takamatsu | 701/78 |
| 2007/0255477 A1 * | 11/2007 | Okuda et al. | 701/93 |
| 2008/0308375 A1 * | 12/2008 | Heeke | 192/3.29 |
| 2009/0294194 A1 * | 12/2009 | Kitano et al. | 180/65.265 |
| 2010/0191400 A1 * | 7/2010 | Ajiro | 701/22 |
| 2012/0265382 A1 * | 10/2012 | Nefcy et al. | 701/22 |
| 2012/0265387 A1 * | 10/2012 | Hisada et al. | 701/22 |
| 2012/0290163 A1 * | 11/2012 | Inagaki et al. | 701/22 |

FOREIGN PATENT DOCUMENTS

| | | |
|---|---|---|
| EP | 1 763 447 B1 | 10/2010 |
| JP | 9-112680 | 5/1997 |
| JP | 11-280879 | 10/1999 |
| JP | 2000-074201 A | 3/2000 |
| JP | 2001-233196 A | 8/2001 |
| JP | 2002-227885 A | 8/2002 |
| JP | 2003-074682 A | 3/2003 |
| JP | 2007-187090 A | 7/2007 |
| JP | 2007-291919 A | 11/2007 |
| JP | 2010-209902 | 9/2010 |
| WO | WO 2012/032639 A1 | 3/2012 |

* cited by examiner

VEHICLE TRAVEL CONTROL APPARATUS

This application is a continuation-in-part application of International Application No. PCT/JP2011/069093, filed Aug. 24, 2011, the contents of which is herein incorporated in its entirety.

TECHNICAL FIELD

The present invention relates to improvement of running control when a vehicle is performing inertia running.

BACKGROUND ART

In a vehicle including a power connecting/disconnecting device interrupting power transmission between an engine and drive wheels, a vehicle running control device is conventionally known that interrupts the power transmission by the power connecting/disconnecting device during inertia running. For example, this corresponds to a clutch control device described in Patent Document 1. In Patent Document 1, a clutch disposed in a power transmission path acts as the power connecting/disconnecting device and, if an accelerator pedal is suddenly returned from a depressed state of the accelerator pedal, the clutch control device releases the clutch to interrupt the power transmission between the engine and the drive wheels. As a result, a fuel consumption rate can be improved.

PRIOR ART DOCUMENTS

Patent Documents

Patent Document 1: Japanese Laid-Open Patent Publication No. 2002-227885
Patent Document 2: Japanese Laid-Open Patent Publication No. 2003-074682
Patent Document 3: Japanese Laid-Open Patent Publication No. 2000-074201
Patent Document 4: Japanese Laid-Open Patent Publication No. 2007-187090
Patent Document 5: Japanese Laid-Open Patent Publication No. 2001-233196
Patent Document 6: Japanese Laid-Open Patent Publication No. 2007-291919

SUMMARY OF THE INVENTION

Problem to be Solved by the Invention

When suddenly returning a depressed accelerator pedal, a driver expects that a so-called engine brake is applied and therefore believes that a deceleration feeling is generated to some extent. However, if the power transmission between the engine and the drive wheels is uniformly interrupted on the condition that the accelerator pedal is suddenly returned as in the case of the clutch control device of Patent Document 1, only a poor deceleration feeling is acquired as compared to the expectation of the driver at a lower vehicle speed when running resistance of the vehicle is small, for example, and the driver may feel strange. Such a problem is not known.

The present invention was conceived in view of the situations and it is therefore an object of the present invention to provide a vehicle running control device capable of improving fuel efficiency during inertia running and reducing a feeling of strangeness given to a driver.

Means for Solving the Problem

To achieve the object, the first aspect of the invention provides a vehicle running control device (a) in a vehicle including a power connecting/disconnecting device interrupting power transmission between an engine and drive wheels, the vehicle running control device providing free-run control of interrupting the power transmission with the power connecting/disconnecting device and stopping the engine during inertia running, wherein (b) the vehicle running control device determines a target vehicle deceleration at the start of the free-run control based on a vehicle speed and estimates an estimated vehicle deceleration when the free-run control is started, before starting the free-run control, and wherein (c) when the estimated vehicle deceleration is closer to the target vehicle deceleration at the start of the free-run control, the free-run control is more easily provided.

Effects of the Invention

Consequently, if the free-run control is provided, since the engine does not act as the running resistance, the fuel efficiency of the vehicle can be improved as compared to the case that the power transmission between the engine and the drive wheels is not interrupted during the inertia running. Since it is considered that vehicle deceleration close to the target vehicle deceleration at the start of the free-run control, i.e., the vehicle deceleration close to desired vehicle deceleration, is easily acquired when the free-run control is assumed to be provided, a feeling of strangeness given to a driver such as a poor deceleration feeling can be reduced even when the free-run control is provided. Therefore, the fuel efficiency can be improved by providing the free-run control while deterioration in drivability is suppressed during the inertia running. Specifically, the desired vehicle deceleration corresponds to a vehicle deceleration requested by a driver. The fuel efficiency refers to, for example, a running distance per unit fuel consumption etc., and improvement in fuel efficiency refers to extension of the running distance per unit fuel consumption, or reduction in fuel consumption rate (=fuel consumption/drive wheel output). Contrarily, reduction (deterioration) in fuel efficiency refers to shortening of the running distance per unit fuel consumption or increase in fuel consumption rate.

The second aspect of the invention provides the vehicle running control device recited in the first aspect of the invention, wherein if a difference between the estimated vehicle deceleration and the target vehicle deceleration at the start of the free-run control is smaller than a predefined deceleration difference determination value, the free-run control is provided. Consequently, although the free-run control is provided when the estimated vehicle deceleration is close to the target vehicle deceleration at the start of the free-run control, the provision of the free-run control can easily be determined by using the deceleration difference determination value. The fuel efficiency can be improved by providing the free-run control while deterioration in drivability is suppressed during the inertia running as is the case of the first aspect of the invention.

The third aspect of the invention provides the vehicle running control device recited in the first or second aspect of the invention, wherein (a) the estimated vehicle deceleration is estimated based on a gradient of a running road traveled by the vehicle, and wherein (b) the target vehicle deceleration at the start of the free-run control is determined based on the gradient of the running road. Consequently, since the vehicle deceleration during inertia running varies depending on the gradient of the running road, whether the free-run control is provided can properly be determined as compared to the case that the gradient of the running road is not taken into account.

The fourth aspect of the invention provides the vehicle running control device recited in the third aspect of the invention, wherein when a downward gradient of the running road is larger, the target vehicle deceleration at the start of the free-run control is smaller. When the downward gradient of the running road is larger, the vehicle is more easily accelerated by the gradient and, therefore, the driver does not expect larger vehicle deceleration. Therefore, according to the fourth aspect of the invention, the target vehicle deceleration at the start of the free-run control can be determined on the running road having a downward gradient in accordance with a deceleration feeling supposed to be expected by the driver.

The fifth aspect of the invention provides the vehicle running control device recited in the third or fourth aspect of the invention, wherein when the running road has an upward gradient, the free-run control is more easily provided as compared to when the running road does not have an upward gradient. When the free-run control is provided during inertia running, the driver hardly feels strange that the deceleration feeling is poor on the running road having an upward gradient because the vehicle is decelerated due to the upward gradient in addition to rolling resistance of the wheels and air resistance. Therefore, according to the fifth aspect of the invention, fuel efficiency can be improved by actively providing the free-run control on the running road having an upward gradient while suppressing a feeling of strangeness caused by the free-run control.

The sixth aspect of the invention provides the vehicle running control device recited in the first or second aspect of the invention, wherein whether the free-run control is provided is determined on the assumption that the target vehicle deceleration at the start of the free-run control is a vehicle deceleration before the start of the free-run control during the inertia running. Consequently, since the free-run-start-time target vehicle deceleration for determining whether the free-run control is provided can be acquired by detecting the vehicle deceleration before the start of the free-run control, the determination can simply and properly be made on whether the free-run control is provided.

The seventh aspect of the invention provides the vehicle running control device recited in any one of the first to sixth aspects of the invention, wherein (a) the vehicle includes an electric motor generating a vehicle braking force, wherein (b) if the free-run control is started, the vehicle braking force of the electric motor is controlled such that an actual vehicle deceleration comes closer to a target vehicle deceleration during the free-run control. Consequently, if the free-run control is started, a deceleration feeling can be given to the driver by the vehicle braking force of the electric motor to reduce a feeling of strangeness.

Preferably, in the vehicle running control device recited in any one of the first to sixth aspects of the invention, (a) the vehicle includes the electric motor coupled to the drive wheels, and (b) the free-run control sets a torque of the electric motor to zero.

MODE FOR CARRYING OUT THE INVENTION

An example of the present invention will now be described in detail with reference to the drawings.

First Example

Figure 1:
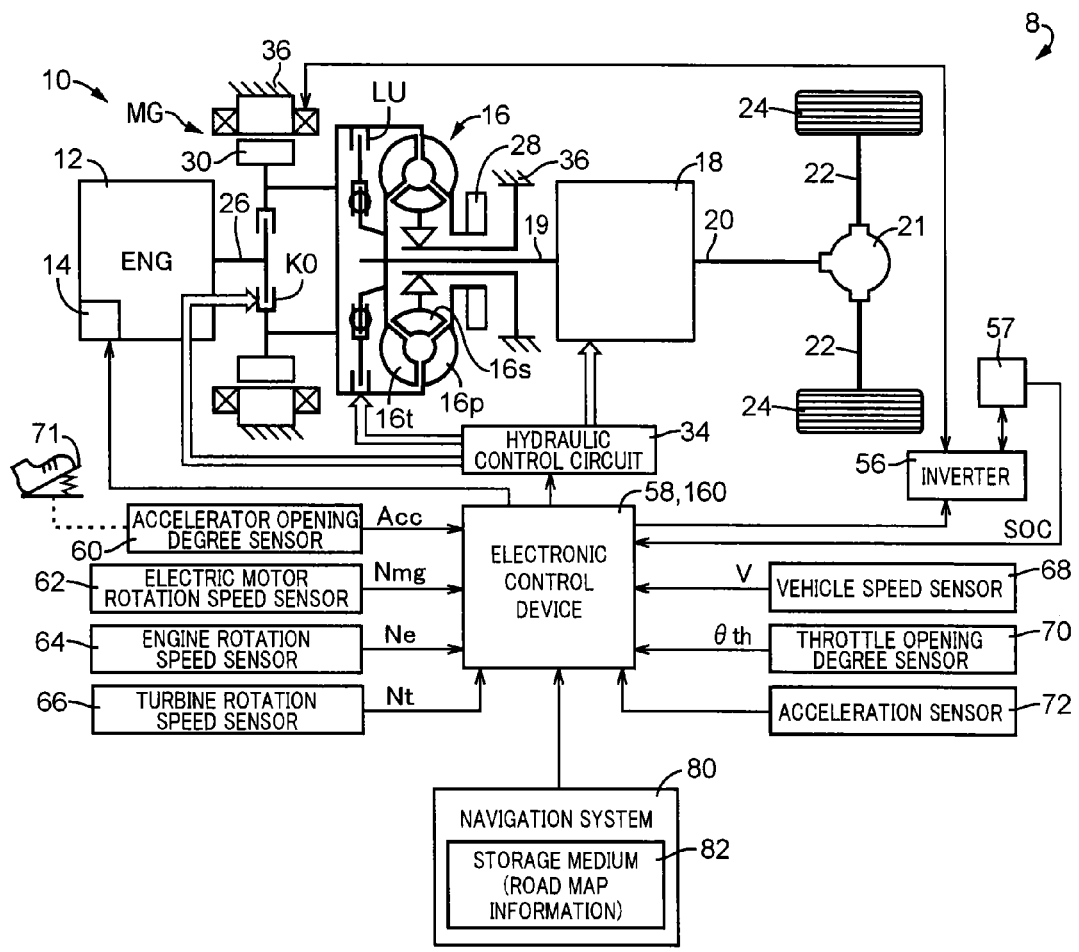
FIG. 1 is a conceptual diagram of a configuration of a drive system according to a hybrid vehicle that is an example of the present invention.

FIG. 1 is a conceptual diagram of a configuration of a drive system according to a hybrid vehicle 8 (hereinafter simply referred to as a "vehicle 8") that is an example of the present invention. The hybrid vehicle 8 depicted in FIG. 1 includes a vehicle drive device 10 (hereinafter referred to as a "drive device 10"), a differential gear device 21, a pair of left and right axles 22, a pair of left and right drive wheels 24, a hydraulic control circuit 34, an inverter 56, and an electronic control device 58. The drive device 10 includes an engine 12 such as a known gasoline engine and diesel engine acting as a drive force source for running, an engine output control device 14 starting or stopping the engine 12 and providing engine output control such as throttle control, an electric motor MG that is an electric motor for running acting as a drive force source for running, an engine connecting/disconnecting clutch K0, a torque converter 16, and an automatic transmission 18. As depicted in FIG. 1, the vehicle 8 is configured such that power generated by one or both of the engine 12 and the electric motor MG is transmitted via each of the torque converter 16, the automatic transmission 18, the differential gear device 21, and the pair of the left and right axles 22 to the pair of the left and right drive wheels 24. Therefore, the vehicle 8 can select engine running using the power of the engine 12 for running and EV running (motor running) using only the power of the electric motor MG for running with the engine 12 stopped, in an alternative manner while running. In the engine running, the electric motor MG may generate an assist torque depending on a running state.

The electric motor MG is coupled to the drive wheels 24, is a three-phase synchronous electric motor, for example, and is a motor generator having a function of a motor (mover) generating the power and a function of a generator (electric generator) generating a reaction force. For example, the electric motor MG performs regenerative operation to generate a vehicle braking force.

A power transmission path between the engine 12 and the electric motor MG is disposed with the engine connecting/disconnecting clutch K0 made up of a generally known wet multi-plate type hydraulic friction engagement device and the engine connecting/disconnecting clutch K0 is operated by an oil pressure supplied from the hydraulic control circuit 34 and acts as a power connecting/disconnecting device selectively interrupting power transmission between the engine 12 and the drive wheels 24. Specifically, an engine output shaft 26 (e.g., crankshaft) acting as an output member of the engine 12 is relatively non-rotatably coupled to a rotor 30 of the electric motor MG when the engine connecting/disconnecting clutch K0 is engaged and, is disconnected from the rotor 30 of the electric motor MG when the engine connecting/disconnecting clutch K0 is released. In short, the engine output shaft 26 is selectively coupled via the engine connecting/disconnecting clutch K0 to the rotor 30 of the electric motor MG. Therefore, the engine connecting/disconnecting clutch K0 is coupled during the engine running and is released during the motor running. The rotor 30 of the electric motor MG is relatively non-rotatably coupled to a pump impeller 16p that is an input member of the torque converter 16.

The automatic transmission 18 makes up a portion of the power transmission path between the torque converter 16 and the drive wheels 24 and transmits the power of the engine 12 or the electric motor MG to the drive wheels 24. The automatic transmission 18 is a stepped automatic transmission performing a clutch-to-clutch shift by changing gripped engagement elements in accordance with a preset relationship (shift diagram). In other words, the automatic transmission 18 is an automatic transmission mechanism having any of predefined shift stages (gear ratios) achieved in an alternative manner and includes a plurality of planetary gear devices and a plurality of clutches or brakes actuated by an oil pressure from the hydraulic control circuit 34 so as to perform the shift.

The torque converter 16 is a hydraulic power transmission device interposed between the electric motor MG and the automatic transmission 18. The torque converter 16 includes the pump impeller 16p that is an input-side rotating element, a turbine impeller 16t that is an output-side rotating element, and a stator impeller 16s. The torque converter 16 transmits the power input to the pump impeller 16p via fluid (operating oil) to the turbine impeller 16t. The stator impeller 16s is coupled via a unidirectional clutch to a transmission case 36 that is a non-rotating member. The torque converter 16 includes between the pump impeller 16p and the turbine impeller 16t a lockup clutch LU selectively directly coupling the pump impeller 16p and the turbine impeller 16t to each other. The lockup clutch LU is controlled by an oil pressure from the hydraulic control circuit 34.

For example, when the motor running is changed to the engine running in the hybrid vehicle 8, an engine rotation speed Ne is raised by engaging the engine connecting/disconnecting clutch K0 to start the engine 12.

During vehicle deceleration when a foot brake is depressed or during inertia running when vehicle braking operation and acceleration operation by a driver are canceled, the electronic control device 58 provides electric motor regeneration control of supplying to an electric storage device 57 regenerative energy acquired by braking the running vehicle 8 with the regenerative operation of the electric motor MG. Specifically, in the electric motor regeneration control, the engine connecting/disconnecting clutch K0 is released to interrupt the power transmission between the engine 12 and the drive wheels 24 while the engine 12 is stopped, and the electric motor MG is regeneratively operated by inertia energy of the vehicle 8. The inertia energy is regenerated as electric power and is stored from the electric motor MG to the electric storage device 57. While the electric motor regeneration control is provided, the lockup clutch LU is engaged. The electronic control device 58 provides free-run control of interrupting the power transmission between the engine 12 and the drive wheels 24 by the engine connecting/disconnecting clutch K0 and stopping the engine 12 instead of the electric motor regeneration control during the inertia running depending on a running state of the vehicle 8 so as to achieve improvement of fuel efficiency. Since the free-run control is not for the purpose of putting a brake on the vehicle for regeneration of electric power, the electric motor MG does not put a brake on the vehicle and a torque Tmg of the electric motor MG (hereinafter referred to as an electric motor torque Tmg) is preferably set to zero. Therefore, the electric motor MG is preferably idled. As a result, the vehicle 8 is allowed to freely run by providing the free-run control. However, the electric motor torque Tmg may slightly be generated such that running resistance is generated in a pseudo manner while the free-run control is provided.

The vehicle 8 includes a control system as exemplarily illustrated in FIG. 1. The electronic control device 58 depicted in FIG. 1 has a function as a vehicle running control device providing control related to running of the vehicle 8 and includes a so-called microcomputer. As depicted in FIG. 1, the electronic control device 58 is supplied with various input signals detected by sensors disposed in the hybrid vehicle 8. For example, the electronic control device 58 receives input of a signal indicative of an accelerator opening degree Acc that is a depression amount of an accelerator pedal 71 detected by an accelerator opening degree sensor 60, a signal indicative of a rotation speed (electric motor rotation speed) Nmg of the electric motor MG detected by an electric motor rotation speed sensor 62, a signal indicative of the rotation speed (engine rotation speed) Ne of the engine 12 detected by an engine rotation speed sensor 64, a signal indicative of a rotation speed (turbine rotation speed) Nt of the turbine impeller 16t of the torque converter 16 detected by a turbine rotation speed sensor 66, a signal indicative of a vehicle speed V detected by a vehicle speed sensor 68, a signal indicative of a throttle opening degree θth of the engine 12 detected by a throttle opening degree sensor 70, a signal indicative of a charge remaining amount (state of charge) SOC of the electric storage device 57 acquired from the electric storage device 57, and a signal indicative of vehicle acceleration in the longitudinal direction of the vehicle 8 detected by an acceleration sensor 72. The electric motor rotation speed Nmg detected by the electric motor rotation speed sensor 62 is an input rotation speed of the torque converter 16 and corresponds to a rotation speed (pump rotation speed) Np of the pump impeller 16p in the torque converter 16. The turbine rotation speed Nt detected by the turbine rotation speed sensor 66 is an output rotation speed of the torque converter 16 and corresponds to a rotation speed Natin, i.e., a transmission input rotation speed Natin, of a transmission input shaft 19 in the automatic transmission 18. A rotation speed Natout, i.e., a transmission output rotation speed Natout, of an output shaft 20 (hereinafter referred to as a transmission output shaft 20) of the automatic transmission 18 corresponds to the vehicle speed V. Although both the vehicle acceleration and a vehicle deceleration are a variation width of the vehicle speed V per unit time and may have both positive and negative values in this example, the positive direction of the vehicle acceleration is the speed increasing direction, while the positive direction of the vehicle deceleration is the speed decreasing direction.

Various output signals are supplied from the electronic control device 58 to the devices disposed on the hybrid vehicle 8.

The vehicle 8 includes a navigation system 80 (hereinafter referred to as a navi-system 80) as depicted in FIG. 1. The navi-system 80 includes a storage medium 82 such as CD-ROM, DVD-ROM, and HDD (hard disk drive), for example, and has a function of providing known navigation control by using road map information stored in the storage medium 82. In the road map information, an actual road is divided into a plurality of nodes and represented by a link as a plurality of sections linking the nodes as is generally known. A link ID (road number) is determined for each link so as to distinguish respective links. The storage medium 82 stores start-point and end-point coordinates defined by nodes, an average curvature radius, a road length, a road gradient, and an altitude used as running road information, a road type such as a general road, an expressway, and a one-way road, information at each node such as an intersection and a passing point of a straight road, etc., for each link ID, and these pieces of information of each link ID are also included in the road map information. The storage medium 82 is configured such that the electronic control device 58 can read the road map information.

Figure 2:
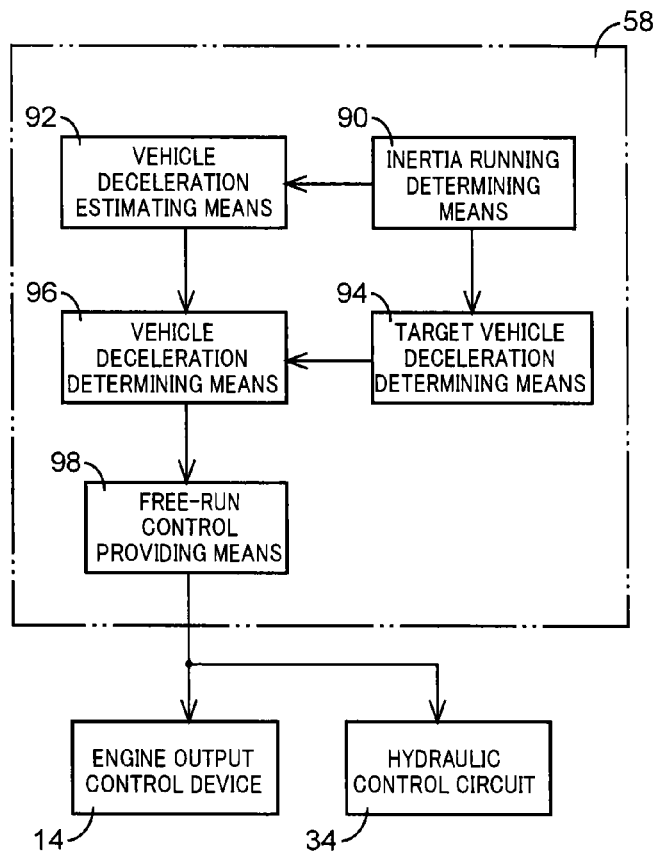
FIG. 2 is a functional block diagram of first example for explaining a main portion of control function included in an electronic control device of FIG. 1.

FIG. 2 is a functional block diagram for explaining a main portion of control function included in the electronic control device 58. As depicted in FIG. 2, the electronic control device 58 includes an inertia running determining means 90 as an inertia running determining portion, a vehicle deceleration estimating means 92 as a vehicle deceleration estimating portion, a target vehicle deceleration determining means 94 as a target vehicle deceleration determining portion, a vehicle deceleration determining means 96 as a vehicle deceleration determining portion, and a free-run control providing means 98 as a free-run control providing portion.

The inertia running determining means 90 determines whether the vehicle 8 is performing inertia running. The inertia running means that both the vehicle braking operation and the acceleration operation by a driver are canceled and that the vehicle 8 is running with the engine connecting/disconnecting clutch K0 engaged while a so-called engine brake is applied to the vehicle 8. Therefore, the inertia running determining means 90 determines that the vehicle 8 is performing the inertia running if both the vehicle braking operation and the acceleration operation are canceled and the engine connecting/disconnecting clutch K0 is engaged while the vehicle 8 is running. Although the electric motor regeneration control may be provided during the inertia running, whether the electric motor regeneration control is provided is not considered. The cancelation of the vehicle braking operation means the case of brake-off when the foot brake is not depressed, for example. The cancellation of the acceleration operation means the case of acceleration-off when the accelerator pedal 71 is not depressed, for example. A driver may maintain a slight accelerator opening degree Acc so as to weaken the so-called engine brake during high speed running and the cancelation of the acceleration operation also includes the case of maintaining a slight accelerator opening degree Acc so as to weaken the engine brake (a running load of a drive system) in this way such that the vehicle speed V is gradually reduced due to the running resistance.

Figure 3:
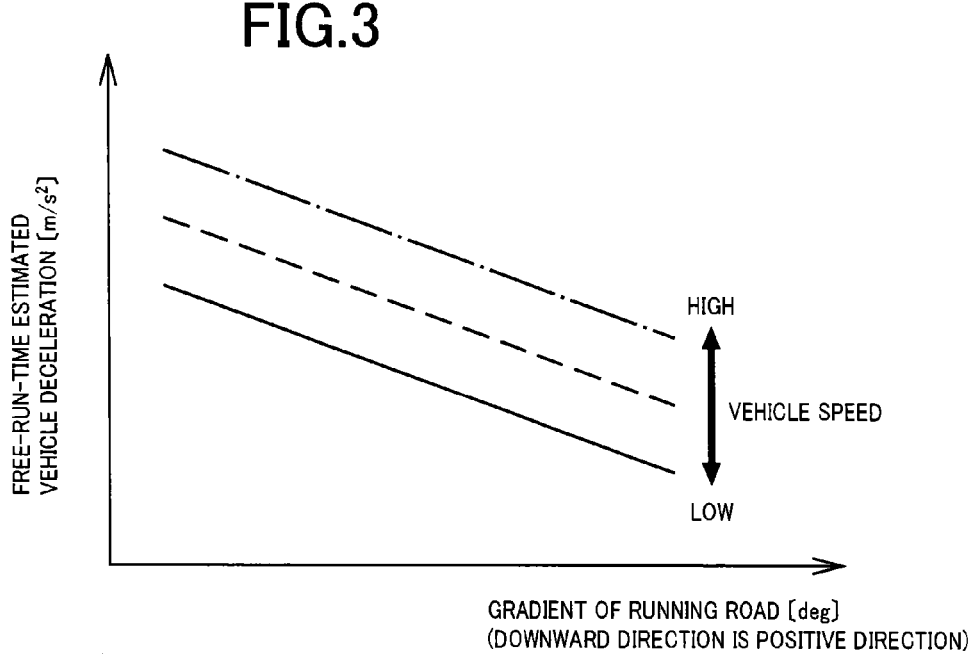
FIG. 3 is a graph of a relationship empirically obtained and set in advance, of free-run-time estimated vehicle deceleration to a gradient of a running road and a vehicle speed used for estimating the free-run-time estimated vehicle deceleration by vehicle deceleration estimating means of the electronic control device of FIG. 2.

If the inertia running determining means 90 determines that the vehicle 8 is performing the inertia running, the vehicle deceleration estimating means 92 estimates estimated vehicle deceleration GFrd when the free-run control is started (hereinafter referred to as free-run-time estimated vehicle deceleration GFrd), before the free-run control is started. In other words, the free-run-time estimated vehicle deceleration GFrd is estimated vehicle deceleration immediately after the start of the free-run control if the free-run control is assumed to be started. The free-run-time estimated vehicle deceleration GFrd has the positive direction defined as the speed decreasing direction of the vehicle and is in $m/s^2$, for example. The vehicle 8 reduces speed due to running resistance after the start of the free-run control and, since the running resistance is the sum of air resistance, gradient resistance, and rolling resistance of wheels (the drive wheels 24 and driven wheels), if a gradient of a running road traveled by the vehicle 8 and a vehicle speed V are known, the free-run-time estimated vehicle deceleration GFrd can be calculated based on the gradient of the running road and the vehicle speed V. In this example, a relationship of the free-run-time estimated vehicle deceleration GFrd to the gradient of the running road and the vehicle speed V is empirically obtained and set in advance as depicted in FIG. 3 and the vehicle deceleration estimating means 92 calculates the free-run-time estimated vehicle deceleration GFrd from the preset relationship depicted in FIG. 3 based on the gradient of the running road and the vehicle speed V. In other words, the free-run-time estimated vehicle deceleration GFrd is estimated. In FIG. 3, when the vehicle speed V is higher, the air resistance and the rolling resistance become larger and, therefore, the free-run-time estimated vehicle deceleration GFrd becomes larger. When the gradient of the running road is larger in the downward direction, the gradient resistance becomes smaller and, therefore, the free-run-time estimated vehicle deceleration GFrd becomes smaller. The gradient of the running road may be obtained from the road map information used by the navi-system 80 or may be detected by sensors included in the vehicle 8.

If the inertia running determining means 90 determines that the vehicle 8 is performing the inertia running, the target vehicle deceleration determining means 94 determines target vehicle deceleration Grdt at the start of the free-run control (hereinafter referred to as free-run-start-time target vehicle deceleration Grdt), before the free-run control is started. During the inertia running of the vehicle 8, a driver expects that speed is reduced by the engine brake and the running resistance, and the free-run-start-time target vehicle deceleration Grdt is empirically defined in advance to achieve vehicle deceleration giving the deceleration feeling expected by the driver during the inertia running. Therefore, since the free-run-start-time target vehicle deceleration Grdt is empirically defined in accordance with the vehicle deceleration expected by the driver during the inertia running, the free-run-start-time target vehicle deceleration Grdt can be considered as a request vehicle deceleration requested by the driver at the start of the free-run control.

Figure 4:
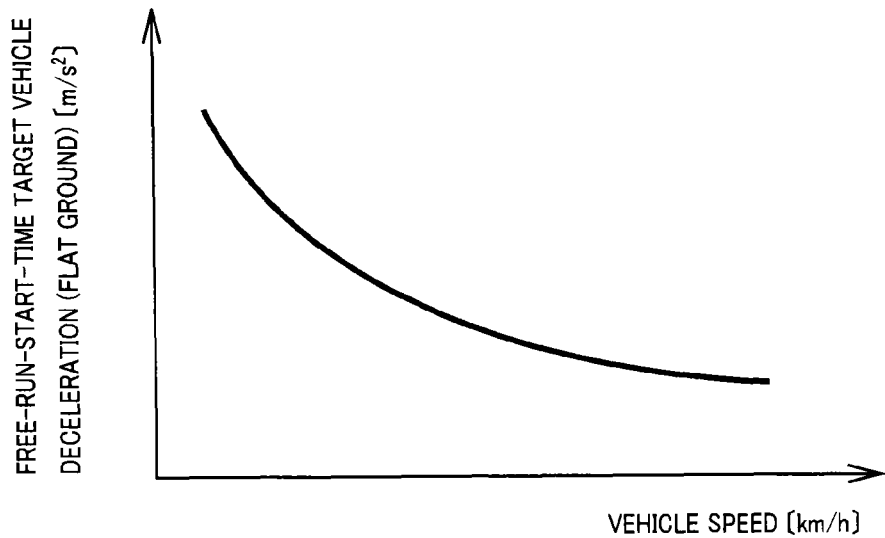
FIG. 4 is a graph of a relation between the free-run-start-time target vehicle deceleration and a vehicle speed V on the flat ground in control of the electronic control device of FIG. 2.
Figure 5:
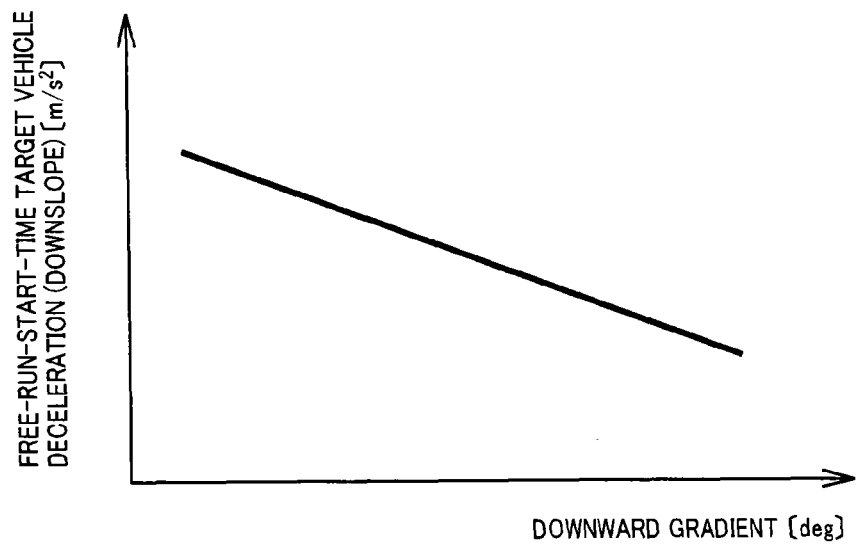
FIG. 5 is a graph of a relation between the free-run-start-time target vehicle deceleration and the gradient of the running road at a certain vehicle speed in the control of the electronic control device of FIG. 2.

Specifically, in this example, the relationships of the free-run-start-time target vehicle deceleration Grdt to the gradient of the running road traveled by the vehicle 8 and the vehicle V are empirically defined in advance as depicted in FIGS. 4 and 5. FIG. 4 depicts a relation between the free-run-start-time target vehicle deceleration Grdt and the vehicle speed V on the flat ground (gradient=0 deg) and FIG. 5 depicts a relation between the free-run-start-time target vehicle deceleration Grdt and the gradient of the running road at a certain vehicle speed V. In FIG. 4, when the vehicle speed V is higher, the free-run-start-time target vehicle deceleration Grdt becomes smaller. This is because the driver has a running feeling that when the vehicle speed V is higher, the automatic transmission 18 is shifted to a gear stage on the higher vehicle speed side, which makes the engine brake less effective, and therefore has lower expectation of deceleration of the vehicle 8 when the vehicle speed V is higher. In FIG. 5, when a downward gradient of the running road is larger, the free-run-start-time target vehicle deceleration Grdt becomes smaller. This is because when the downward gradient of the running road is larger, the gradient resistance becomes smaller and the driver has lower expectation of deceleration of the vehicle 8. As described above, the target vehicle deceleration determining means 94 determines the free-run-start-time target vehicle deceleration Grdt from the predefined relationships depicted in FIGS. 4 and 5 based on the vehicle speed V and the gradient of the running road before the free-run control is started. The vehicle speed V and the gradient of the running road used as the base of determining the free-run-start-time target vehicle deceleration Grdt are preferably the same as the vehicle speed V and the gradient of the running road used as the base of estimating the free-run-time estimated vehicle deceleration GFrd by the vehicle deceleration estimating means 92.

If the running road traveled by the vehicle 8 has an upward gradient, the target vehicle deceleration determining means 94 determines the free-run-start-time target vehicle deceleration Grdt at the same value as the free-run-time estimated vehicle deceleration GFrd estimated by the vehicle deceleration estimating means 92 regardless of the predefined relationships depicted in FIGS. 4 and 5. This is because when the running road has an upward gradient, a determination of the vehicle deceleration determining means 96 described later is affirmed and the free-run control is more easily provided as compared to when the running road does not have an upward gradient, i.e., has a downward gradient or is the flat ground. When the running road has an upward gradient, the gradient of the running road may be larger than zero in the upward direction defined as the positive direction; however, preferably, the gradient is the upward gradient equal to or greater than a predetermined gradient of the level at which the driver can feel the gradient resistance during vehicle running.

The vehicle deceleration determining means 96 acquires the free-run-time estimated vehicle deceleration GFrd estimated by the vehicle deceleration estimating means 92 and the free-run-start-time target vehicle deceleration Grdt determined by the target vehicle deceleration determining means 94 and determines whether an absolute value of a vehicle deceleration difference DGrd (=GFrd−Grdt), i.e., a difference DGrd between the free-run-time estimated vehicle deceleration GFrd and the free-run-start-time target vehicle deceleration Grdt, is smaller than a predefined deceleration difference determination value DG1rd. Whether the absolute value of the vehicle deceleration difference DGrd is smaller than the deceleration difference determination value DG1rd is a condition of starting provision of the free-run control. Therefore, it can be said that the vehicle deceleration determining means 96 determines whether the free-run control is provided, under the provision start condition that the free-run control is more easily provided when the free-run-time estimated vehicle deceleration GFrd is closer to the free-run-start-time target vehicle deceleration Grdt. In other words, when the absolute value of the vehicle deceleration difference DGrd is smaller than the deceleration difference determination value DG1rd, the free-run-time estimated vehicle deceleration GFrd is closer to the free-run-start-time target vehicle deceleration Grdt as compared to when the absolute value is not smaller and, since the free-run control is provided when the absolute value of the vehicle deceleration difference DGrd is smaller than the deceleration difference determination value DG1rd, it can be said that the free-run control is more easily provided when the free-run-time estimated vehicle deceleration GFrd is closer to the free-run-start-time target vehicle deceleration Grdt. The deceleration difference determination value DG1rd is empirically defined in advance such that the driver is prevented from feeling a poor deceleration feeling when the free-run control is provided and that the free-run control is more easily provided.

The free-run control providing means 98 provides the free-run control of interrupting the power transmission between the engine 12 and the drive wheels 24 by the engine connecting/disconnecting clutch K0 and stopping the engine 12 during the inertia running in accordance with the determination of the vehicle deceleration determining means 96. In the free-run control, the engine connecting/disconnecting clutch K0 is released and the engine 12 is stopped. In this example, the electric motor MG is idled while the free-run control is provided. Specifically, if the vehicle deceleration determining means 96 determines that the absolute value of the vehicle deceleration difference DGrd is smaller than the deceleration difference determination value DG1rd, the free-run control providing means 98 provides the free-run control. On the other hand, if it is determined that absolute value of the vehicle deceleration difference DGrd is equal to or greater than the deceleration difference determination value DG1rd, the free-run control providing means 98 does not provide the free-run control. For example, in this case, the electric motor regeneration control may be provided without the provision of the free-run control.

After the provision of the free-run control is started, if the acceleration operation is performed (acceleration is turned on) by, for example, depressing the accelerator pedal 71, the free-run control providing means 98 terminates the free-run control.

Although the target vehicle deceleration determining means 94 determines the free-run-start-time target vehicle deceleration Grdt from the predefined relationships depicted in FIGS. 4 and 5 before the free-run control is started as described above, the target vehicle deceleration determining means 94 may detect vehicle deceleration with the acceleration sensor 72 before (immediately before) the free-run control is started during the inertia running, for example, and set the free-run-start-time target vehicle deceleration Grdt to the vehicle deceleration before the start of the free-run control during the inertia running without following FIGS. 4 and 5. This is because it is considered that, before the start of free-run control during the inertia running, the vehicle deceleration at this point is turned to the vehicle deceleration expected by the driver due to the drive system acting as a running load etc. If the target vehicle deceleration determining means 94 determines the free-run-start-time target vehicle deceleration Grdt in this way, the vehicle deceleration determining means 96 determines whether the free-run control is provided on the assumption that the free-run-start-time target vehicle deceleration Grdt is the vehicle deceleration before the start of the free-run control during the inertia running.

Figure 6:
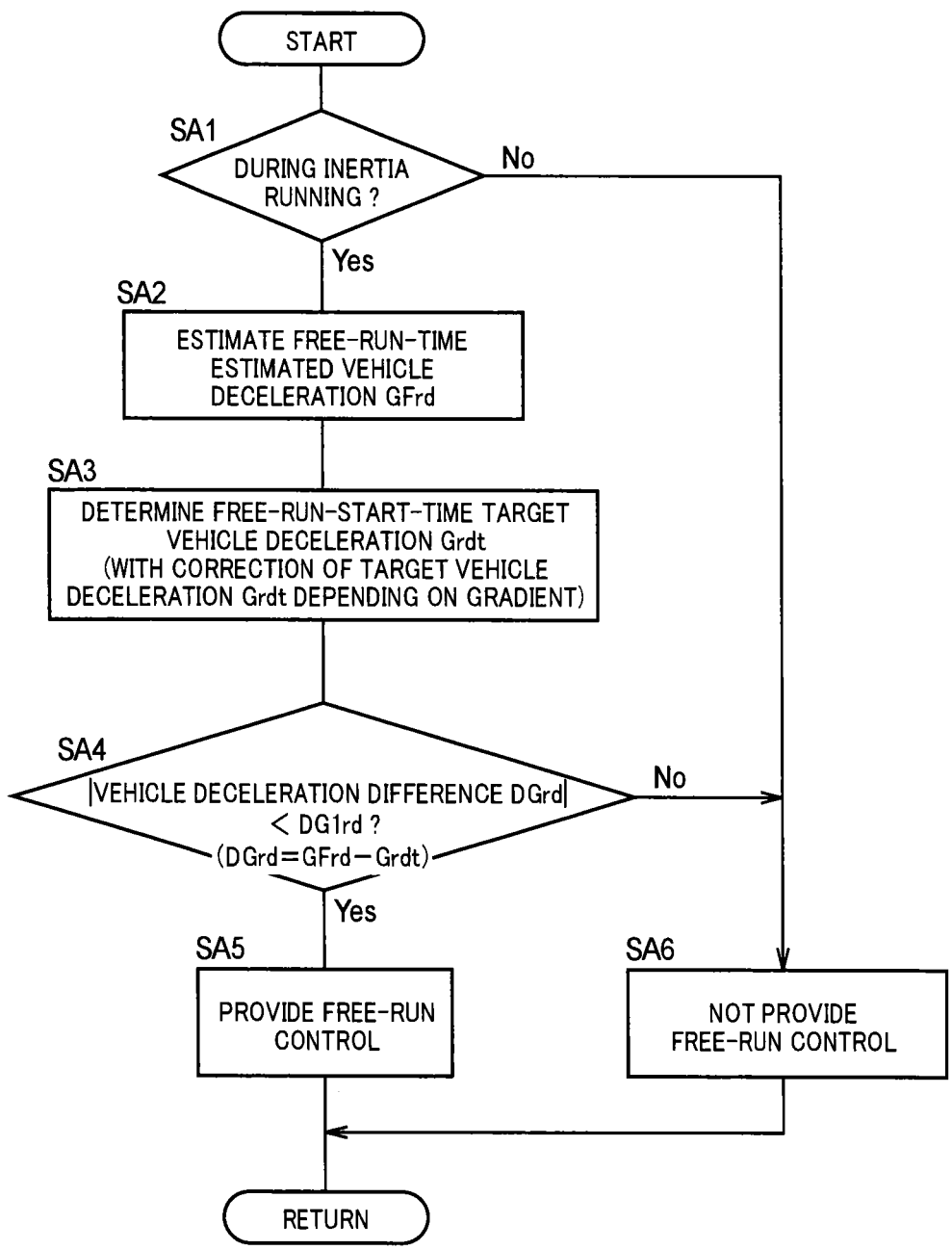
FIG. 6 is a flowchart of second example for explaining a main portion of a control operation of the electronic control device of FIG. 2, i.e., a control operation of providing the free-run control.

FIG. 6 is a flowchart for explaining a main portion of a control operation of the electronic control device 58, i.e., a control operation of providing the free-run control, and is repeatedly executed with an extremely short cycle time, for example, on the order of a few msec to a few tens of msec. For example, the control operation depicted in FIG. 6 is started when the free-run control is not yet provided. The control operation depicted in FIG. 6 is performed independently or concurrently with another control operation.

First, at step (hereinafter, "step" will be omitted) SA1 of FIG. 6, it is determined whether the vehicle 8 is performing inertia running. If the determination of SA1 is affirmative, i.e., if the vehicle 8 is performing inertia running, the operation goes to SA2. On the other hand, if the determination of SA1 is negative, the operation goes to SA6. SA1 corresponds to the inertia running determining means 90.

At SA2 corresponding to the vehicle deceleration estimating means 92, the vehicle speed V and the gradient of the running road are acquired through detection etc. The estimated vehicle deceleration GFrd at the start of the free-run control, i.e., the free-run-time estimated vehicle deceleration GFrd, is estimated based on the vehicle speed V and the gradient of the running road on the assumption that the free-run control is provided. SA2 is followed by SA3.

At SA3 corresponding to the target vehicle deceleration determining means 94, the vehicle speed V and the gradient of the running road are acquired through detection etc., and the free-run-start-time target vehicle deceleration Grdt is determined from the predefined relationships depicted in FIGS. 4 and 5 based on the vehicle speed V and the gradient of the running road. The free-run-start-time target vehicle deceleration Grdt may immediately be calculated based on the vehicle speed V and the gradient of the running road or may be calculated by first calculating a value on the flat ground from the predefined relationship depicted in FIG. 4 based on the vehicle speed V and then correcting the value on the flat ground in accordance with the predefined relationship depicted in FIG. 5 based on the gradient of the running road. If the running road traveled by the vehicle 8 has an upward gradient, the free-run-start-time target vehicle deceleration Grdt is determined at the same value as the free-run-time estimated vehicle deceleration GFrd estimated at SA2 regardless of the predefined relationships depicted in FIGS. 4 and 5.

At SA3, the free-run-start-time target vehicle deceleration Grdt may be set to the vehicle deceleration detected before (immediately before) the free-run control is started during the inertia running on the assumption that the free-run control is provided, without following FIGS. 4 and 5. The upward gradient may be excluded or may not be excluded from the gradient of the running road in this case. SA3 is followed by SA4.

At SA4 corresponding to the vehicle deceleration determining means 96, the vehicle deceleration difference DGrd is calculated that is a difference DGrd between the free-run-time estimated vehicle deceleration GFrd estimated at SA2 and the free-run-start-time target vehicle deceleration Grdt determined at SA3, and it is determined whether the absolute value of the vehicle deceleration difference DGrd is smaller than the deceleration difference determination value DG1rd. If the determination of SA4 is affirmative, i.e., if the absolute value of the vehicle deceleration difference DGrd is smaller than the deceleration difference determination value DG1rd, the operation goes to SA5. On the other hand, if the determination of SA4 is negative, the operation goes to SA6.

At SA5, the free-run control is provided. On the other hand, at SA6, the free-run control is not provided. SA5 and SA6 correspond to the free-run control providing means 98.

According to this example, the free-run-start-time target vehicle deceleration Grdt is determined based on the vehicle speed V and the free-run-time estimated vehicle deceleration GFrd is estimated before the free-run control is started. The free-run control is provided if the absolute value of the vehicle deceleration difference DGrd (=GFrd−Grdt) is smaller than the deceleration difference determination value DG1rd. Therefore, it can be said that the free-run control is more easily provided when the free-run-time estimated vehicle deceleration GFrd is closer to the free-run-start-time target vehicle deceleration Grdt. If the free-run control is provided in this way, since it is considered that the vehicle deceleration close to the free-run-start-time target vehicle deceleration Grdt, i.e., the vehicle deceleration close to the desired vehicle deceleration requested by the driver, is easily acquired when the free-run control is assumed to be provided, a feeling of strangeness given to a driver such as a poor deceleration feeling can be reduced even when the free-run control is provided. Since the engine 12 does not act as the running resistance in the free-run control, the fuel efficiency of the vehicle 8 can be improved as compared to the case that the power transmission between the engine 12 and the drive wheels 24 is not interrupted during the inertia running. Therefore, the fuel efficiency can be improved by providing the free-run control while deterioration in drivability is suppressed during the inertia running.

Since the free-run-time estimated vehicle deceleration GFrd is estimated before the free-run control is started to determine whether the free-run control is provided, it is avoided that the free-run control is immediately terminated because the vehicle deceleration detected after the start of the free-run control is considered inappropriate. Therefore, the engine start can be made less frequent and an energy loss due to the engine start can be suppressed.

According to this example, if the vehicle deceleration determining means 96 determines that the absolute value of the vehicle deceleration difference DGrd is smaller than the deceleration difference determination value DG1rd, the free-run control providing means 98 provides the free-run control. Therefore, the provision of the free-run control can easily be realized when the free-run-time estimated vehicle deceleration GFrd is close to the free-run-start-time target vehicle deceleration Grdt, by using the deceleration difference determination value DG1rd.

According to this example, the vehicle deceleration estimating means 92 estimates the free-run-time estimated vehicle deceleration GFrd based on a gradient of a running road traveled by the vehicle 8. The target vehicle deceleration determining means 94 determines the free-run-start-time target vehicle deceleration Grdt based on the gradient of the running road. The vehicle deceleration during inertia running varies depending on the gradient of the running road. Therefore, whether the free-run control is provided can properly be determined as compared to the case that the gradient of the running road is not taken into account.

According to this example, as depicted in FIG. 5, when the downward gradient of the running road is larger, the free-run-start-time target vehicle deceleration Grdt becomes smaller. When the downward gradient of the running road is larger, the vehicle 8 is more easily accelerated by the gradient and, therefore, the driver does not expect larger vehicle deceleration. Therefore, the free-run-start-time target vehicle deceleration Grdt can be determined on the running road having a downward gradient in accordance with a deceleration feeling supposed to be expected by the driver.

According to this example, if the running road traveled by the vehicle 8 has an upward gradient, the target vehicle deceleration determining means 94 determines the free-run-start-time target vehicle deceleration Grdt at the same value as the free-run-time estimated vehicle deceleration GFrd estimated by the vehicle deceleration estimating means 92 regardless of the predefined relationships depicted in FIGS. 4 and 5. As a result, since the vehicle deceleration difference DGrd is set to zero and it is determined that the absolute value of the vehicle deceleration difference DGrd is smaller than the deceleration difference determination value DG1rd, the free-run control is more easily provided when the running road has an upward gradient as compared to when the running road does not have an upward gradient. When the free-run control is provided during inertia running, the driver hardly feels strange that the deceleration feeling is poor on the running road having an upward gradient because the vehicle 8 is decelerated due to the upward gradient in addition to the rolling resistance of the wheels and the air resistance. Therefore, fuel efficiency can be improved by actively providing the free-run control on the running road having an upward gradient while suppressing a feeling of strangeness caused by the free-run control.

According to this example, the vehicle deceleration determining means 96 may determine whether the free-run control is provided on the assumption that the free-run-start-time target vehicle deceleration Grdt is the vehicle deceleration before the start of the free-run control during the inertia running. As a result, since the free-run-start-time target vehicle deceleration Grdt for determining whether the free-run control is provided can be acquired by detecting the vehicle deceleration before the start of the free-run control, the determination can simply and properly be made on whether the free-run control is provided.

Another example of the present invention will be described. In the following description, the portions mutually common to the examples are denoted by the same reference numerals and will not be described.

Second Example

Figure 7:
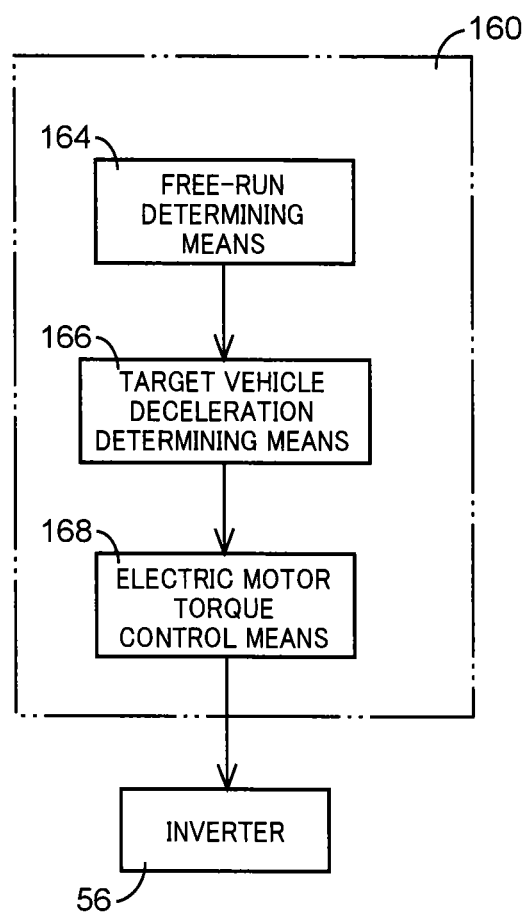
FIG. 7 is a functional block diagram of second example for describing a main portion of a control function included in the electronic control device of FIG. 1.

In this example (second example), the electronic control device 58 of the first example is replaced with an electronic control device 160. Although the control for determining whether the free-run control is provided is mainly described in the first example, control after the start of the free-run control will mainly be described in the second example. FIG. 7 is a functional block diagram for describing a main portion of a control function included in the electronic control device 160. As depicted in FIG. 7, the electronic control device 160 includes a free-run determining means 164 as a free-run determining portion, a target vehicle deceleration determining means 166 as a target vehicle deceleration determining portion, and an electric motor torque control means 168 as an electric motor torque control portion.

The free-run determining means 164 of FIG. 7 determines whether the free-run control is started. For example, if the free-run control providing means 98 of the first example starts the free-run control, the free-run determining means 164 determines that the free-run control is started. The determination may be made from an operation state of the engine 12, an operation state of the engine connecting/disconnecting clutch K0, and the electric motor torque Tmg.

If the free-run determining means 164 determines that the free-run control is started, the target vehicle deceleration determining means 166 detects the vehicle speed V from the vehicle speed sensor 68 and acquires a gradient of a running road at the position of the vehicle from the road map information. The target vehicle deceleration determining means 166 then determines a predetermined electric motor control target vehicle deceleration Grdmgt that is a target value of vehicle deceleration for determining the electric motor torque Tmg corresponding to a vehicle braking force of the electric motor MG, based on the vehicle speed V and the gradient of the running road. Although the electric motor control target vehicle deceleration Grdmgt is empirically defined in advance to achieve vehicle deceleration giving the deceleration feeling expected by the driver during the inertia running as is the case with the free-run-start-time target vehicle deceleration Grdt, a difference is that the vehicle speed V and the gradient of the running road used as the base of the determination are acquired at the timing after the start of the free-run control. In short, the electric motor control target vehicle deceleration Grdmgt is a target vehicle deceleration during the free-run control. The target vehicle deceleration determining means 166 determines the electric motor control target vehicle deceleration Grdmgt in the same way as the target vehicle deceleration determining means 94 of the first example determining the free-run-start-time target vehicle deceleration Grdt. For example, the target vehicle deceleration determining means 166 first replaces the vertical axis of FIG. 4 with the electric motor control target vehicle deceleration Grdmgt and determines the electric motor control target vehicle deceleration Grdmgt on the flat ground from the predefined relationship of FIG. 4 based on the vehicle speed V. If the gradient of the running road is a downward gradient, the target vehicle deceleration determining means 166 replaces the vertical axis of FIG. 5 with the electric motor control target vehicle deceleration Grdmgt and corrects the electric motor control target vehicle deceleration Grdmgt acquired from FIG. 4 such that the electric motor control target vehicle deceleration Grdmgt is made smaller when the downward gradient is larger in accordance with the predefined relationship of FIG. 5. In this case, since the driver does not expect a deceleration feeling during inertia running on a downward gradient as compared to the flat ground, the electric motor control target vehicle deceleration Grdmgt on a downward gradient is always smaller than the electric motor control target vehicle deceleration Grdmgt on the flat ground.

On the other hand, if the gradient of the running road is an upward gradient, the target vehicle deceleration determining means 166 detects the actual vehicle deceleration at the current time point with the acceleration sensor 72 and determines the electric motor control target vehicle deceleration Grdmgt at the same value as the detected actual vehicle deceleration. As a result, if the running road has an upward gradient, the electric motor torque control means 168 described later controls the electric motor torque Tmg on the assumption that the electric motor control target vehicle deceleration Grdmgt is the actual vehicle deceleration in vehicle deceleration control described later. In short, the electric motor torque control means 168 sets the electric motor torque Tmg to zero on an upward gradient. Although when a gradient of the running road is an upward gradient, the gradient of the running road may be larger than zero in the upward direction defined as the positive direction; however, preferably, the gradient is the upward gradient equal to or greater than a predetermined gradient of the level at which the driver can feel the gradient resistance during vehicle running.

If the target vehicle deceleration determining means 166 determines the electric motor control target vehicle deceleration Grdmgt, the electric motor torque control means 168 provides the vehicle deceleration control of controlling the electric motor torque Tmg such that the actual vehicle deceleration detected by the acceleration sensor 72 comes closer to the electric motor control target vehicle deceleration Grdmgt. The electric motor torque Tmg corresponds to the vehicle braking force of the electric motor MG. For example, the electric motor torque control means 168 calculates a difference acquired by subtracting the actual vehicle deceleration from the electric motor control target vehicle deceleration Grdmgt and controls the electric motor torque Tmg such that the calculated vehicle deceleration difference comes closer to zero with the gear ratio of the automatic transmission 18 etc., taken into account in the vehicle deceleration control. Although the electric motor torque Tmg is basically generated in the speed decreasing direction, i.e., the regeneration direction, of the vehicle 8 in the vehicle deceleration control, the electric motor torque Tmg may be generated in the speed increasing direction of the vehicle 8. The lockup clutch LU is preferably engaged while the vehicle deceleration control is provided. While the vehicle deceleration control is provided, the actual vehicle deceleration is sequentially detected by the acceleration sensor 72 and the electric motor control target vehicle deceleration Grdmgt is accordingly sequentially updated by the target vehicle deceleration determining means 166 depending on the vehicle speed V and the gradient of the running road.

After the provision of the vehicle deceleration control is started, if the acceleration operation is performed by, for example, depressing the accelerator pedal 71, the electric motor torque control means 168 terminates the vehicle deceleration control.

Figure 8:
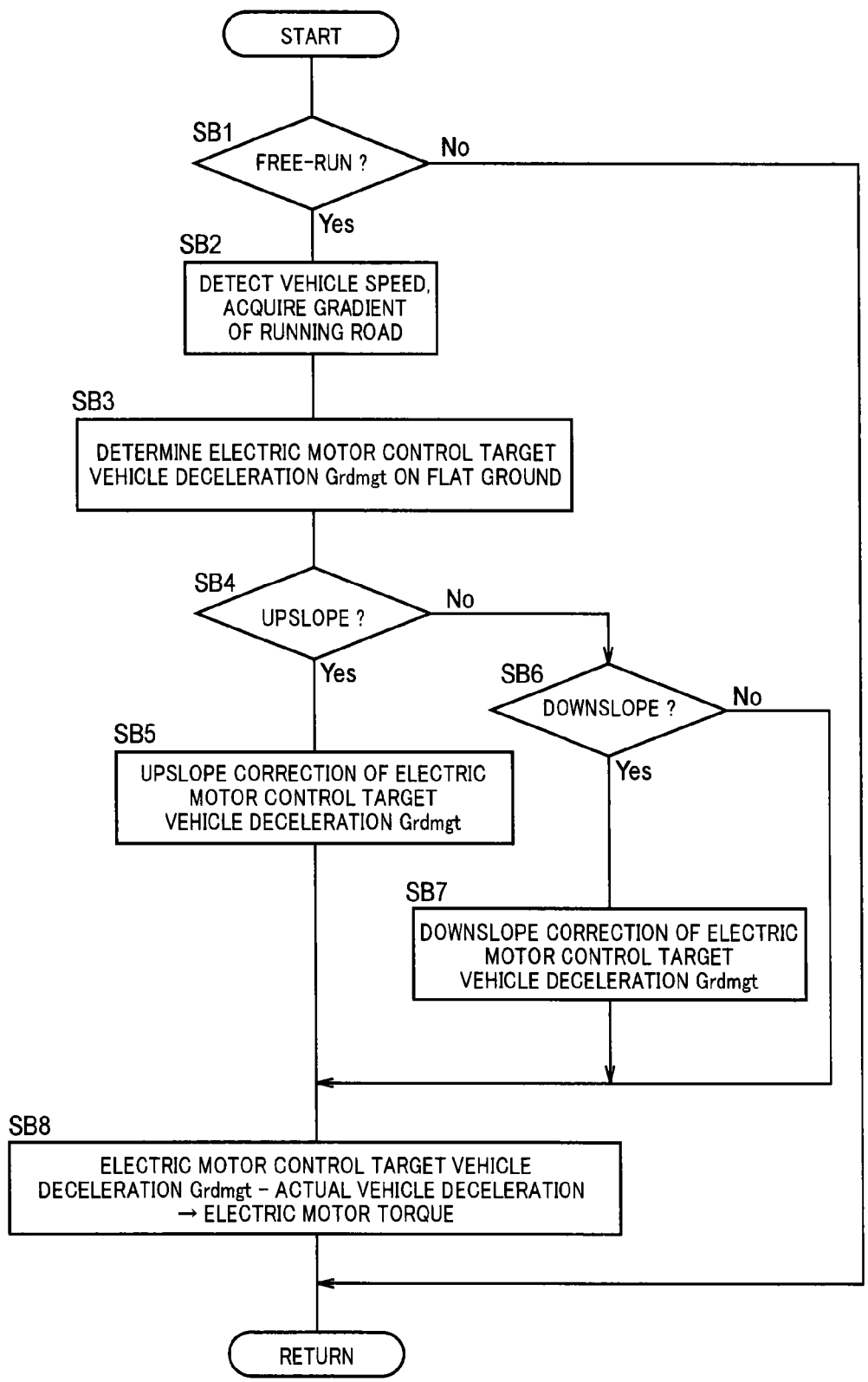
FIG. 8 is a flowchart of second example for explaining a main portion of a control operation of an electronic control device of FIG. 7, i.e., a control operation of providing vehicle deceleration control during inertia running.

FIG. 8 is a flowchart for explaining a main portion of a control operation of the electronic control device 160, i.e., a control operation of providing the vehicle deceleration control during inertia running, and is repeatedly executed with an extremely short cycle time, for example, on the order of a few msec to a few tens of msec. The control operation depicted in FIG. 8 is performed independently or concurrently with another control operation.

First, at SB1 of FIG. 8, it is determined whether the free-run control is started. For example, if the free-run control is started and is not yet terminated, it is determined that the free-run control is started. If the determination of SB1 is affirmative, i.e., if the free-run control is started, the operation goes to SB2. On the other hand, if the determination of SB1 is negative, this flowchart is terminated. SB1 corresponds to the free-run determining means 164. Even if the vehicle deceleration control is provided at SB8 described later, the determination of SB1 is not switched from affirmative to negative because of the provision.

At SB2, the vehicle speed V is detected by the vehicle speed sensor 68 and a gradient of a running road at the position of the vehicle is acquired from the road map information. SB2 is followed by SB3.

At SB3, the vertical axis of FIG. 4 is replaced with the electric motor control target vehicle deceleration Grdmgt and the electric motor control target vehicle deceleration Grdmgt on the flat ground is determined from the predefined relationship of FIG. 4 based on the vehicle speed V. SB3 is followed by SB4.

At SB4, it is determined whether the gradient of the running road acquired at SB2 is an upward gradient, i.e., the running road is an upslope. If the determination of SB4 is affirmative, i.e., if the gradient of the running road is an upward gradient, the operation goes to SB5. On the other hand, if the determination of SB4 is negative, the operation goes to SB6. When the gradient of the running road is determined as an upward gradient at SB4, the gradient of the running road may be larger than zero in the upward direction defined as the positive direction; however, preferably, the gradient is the upward gradient equal to or greater than a predetermined gradient (in the upward direction defined as the positive direction) of the level at which the driver can feel the gradient resistance during vehicle running.

At SB5, the electric motor control target vehicle deceleration Grdmgt determined at SB3 is corrected depending on that the gradient of the running road is an upward gradient. Specifically, the actual vehicle deceleration at the current time point is detected by the acceleration sensor 72 and the electric motor control target vehicle deceleration Grdmgt is corrected to the same value as the detected actual vehicle deceleration. SB5 is followed by SB8.

At SB6, it is determined whether the gradient of the running road acquired at SB2 is a downward gradient, i.e., the running road is a downslope. For example, when the gradient of the running road is determined as a downward gradient at SB6, the gradient of the running road may be larger than zero in the downward direction defined as the positive direction; however, preferably, the gradient is the downward gradient equal to or greater than a predetermined gradient (in the downward direction defined as the positive direction) of the level at which the driver can feel that the gradient resistance is smaller than the flat ground during vehicle running. If the determination of SB6 is affirmative, i.e., if the gradient of the running road is a downward gradient, the operation goes to SB7. On the other hand, if the determination of SB6 is negative, the operation goes to SB8.

At SB7, the electric motor control target vehicle deceleration Grdmgt determined at SB3 is corrected depending on that the gradient of the running road is a downward gradient. Specifically, the vertical axis of FIG. 5 is replaced with the electric motor control target vehicle deceleration Grdmgt and the electric motor control target vehicle deceleration Grdmgt determined at SB3 is corrected such that the electric motor control target vehicle deceleration Grdmgt becomes smaller when the downward gradient of the running road is larger in accordance with the predefined relationship of FIG. 5. SB7 is followed by SB8. SB2 to SB7 correspond to the target vehicle deceleration determining means 166.

At SB8 corresponding to the electric motor torque control means 168, the vehicle deceleration control is provided. For example, the actual vehicle deceleration is detected by the acceleration sensor 72 and a difference is calculated by subtracting the actual vehicle deceleration from the electric motor control target vehicle deceleration Grdmgt in the vehicle deceleration control. The electric motor torque Tmg is controlled such that the calculated difference comes closer to zero.

According to this embodiment, if the free-run control is started, the electric motor torque control means 168 provides the vehicle deceleration control of controlling the electric motor torque Tmg such that the actual vehicle deceleration detected by the acceleration sensor 72 comes closer to the electric motor control target vehicle deceleration Grdmgt (target vehicle deceleration during the free-run control). The electric motor torque Tmg corresponds to the vehicle braking force of the electric motor MG. Therefore, if the free-run control is started, a deceleration feeling can be given to the driver by the vehicle braking force of the electric motor MG to reduce a feeling of strangeness. If the running road has an upward gradient, the electric motor torque control means 168 controls the electric motor torque Tmg on the assumption that the electric motor control target vehicle deceleration Grdmgt is the actual vehicle deceleration in the vehicle deceleration control. In short, the electric motor torque control means 168 sets the electric motor torque Tmg to zero on an upward gradient. Therefore, since the electric motor MG does not generate the vehicle braking force on a running road having an upward gradient, the fuel efficiency can be improved on the running road having an upward gradient. Even if the electric motor torque Tmg is set to zero on a running road having an upward gradient, a deceleration feeling can be given to the driver by the upward gradient to suppress the feeling of strangeness.

Although the examples of the present invention have been described in detail with reference to the drawings, these examples are merely an embodiment and the present invention may be implemented in variously modified and improved forms based on the knowledge of those skilled in the art.

For example, although the free-run control is started during inertia running in the first example, the free-run control may be started at the same time as the start of the inertia running or the free-run control may be started with a delay after the start of the inertia running.

Figure 9:
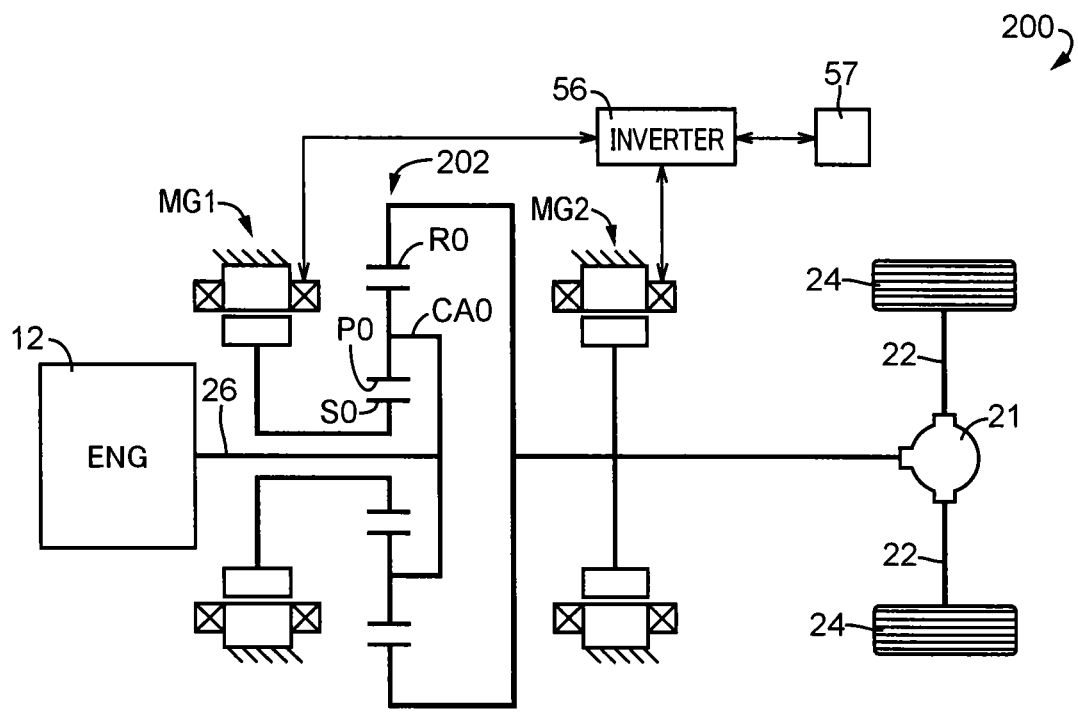
FIG. 9 is a schematic diagram of another hybrid vehicle than that of FIG. 1, and to which the present invention applied.

Although the vehicle 8 is a hybrid vehicle including the one electric motor MG in the second example, for example, the vehicle 8 may be replaced with a hybrid vehicle 200 including two electric motors, i.e., a first electric motor MG1 and a second electric motor MG2 as depicted in FIG. 9. In FIG. 9, the hybrid vehicle 200 includes the engine 12, the first electric motor MG1, a planetary gear device 202 as a differential mechanism, the second electric motor MG2, etc. The power of the engine 12 and the second electric motor MG2 is transmitted from a ring gear R0 of the planetary gear device 202 sequentially via the differential gear device 21, the pair of the axles 22, etc., to the pair of the drive wheels 24. The planetary gear device 202 includes a carrier CA0 coupled to the engine 12, a sun gear S0 coupled to the first electric motor MG1, a ring gear R0 integrally rotating with the second electric motor MG2 and coupled to the drive wheels 24, and a pinion gear P0 meshed with each of the ring gear R0 and the sun gear S0 and freely rotatably supported by the carrier CA0. In the planetary gear device 202 configured as described above, the first electric motor MG1 outputs a reaction torque against engine torque Te to transmit power from the engine 12 to the drive wheels 24. Contrarily, the first electric motor MG1 is idled to interrupt the power transmission between the engine 12 and the drive wheels 24. Therefore, the first electric motor MG1 and the second electric motor MG2 of the hybrid vehicle 200 correspond to the power connecting/disconnecting device of the present invention. The second electric motor MG2 performs regenerative operation to generate a vehicle braking force. During the inertia running of the hybrid vehicle 200, for example, the first electric motor MG1 is idled while the engine 12 is stopped and the engine brake is generated in a pseudo manner by the regenerative operation of the second electric motor MG2.

Although the vehicle 8 includes the electric motor MG in the first example, the vehicle 8 may be replaced with an engine vehicle without the electric motor MG. The vehicle 8 may be replaced with the hybrid vehicle 200 depicted in FIG. 9.

If the vehicle deceleration control is provided in the second example, the vehicle deceleration control may be started at the same time as the start of the free-run control or the vehicle deceleration control may be started with a delay after the start of the free-run control.

If the running road traveled by the vehicle 8 has an upward gradient in the first example, the free-run-start-time target vehicle deceleration Grdt is determined at the same value as the free-run-time estimated vehicle deceleration GFrd to facilitate the provision of the free-run control as compared to when the running road does not have an upward gradient; however, another method may be used for facilitating the provision of the free-run control if the running road has an upward gradient. For example, if the running road has an upward gradient, the free-run control providing means 98 may provide the free-run control regardless of the determination of the vehicle deceleration determining means 96. Alternatively, if the running road has an upward gradient, the deceleration difference determination value DG1rd may be changed and set to a larger value as compared to the case without an upward gradient so as to facilitate the provision of the free-run control.

Although the electric motor MG is coupled to the pump impeller 16p of the torque converter 16 as depicted in FIG. 1 in the first and second examples, the electric motor MG may be coupled to the transmission output shaft 20 instead of the pump impeller 16p.

Although both the power of the engine 12 and the power of the electric motor MG are transmitted to the common drive wheels 24 in the first and second examples, the vehicle 8 may have the power of the engine 12 transmitted to either front wheels or rear wheels and the power of the electric motor MG transmitted to the other wheels. In this case, the front wheels and the rear wheels are the drive wheels of the vehicle 8.

Although the vehicle 8 includes the automatic transmission 18 as depicted in FIG. 1 in the first and second examples, the automatic transmission 18 is not essential.

Although the torque converter 16 includes the lockup clutch LU in the first and second examples, the lockup clutch LU may not be included. The torque converter 16 is not essential.

Although SA3 is executed after SA2 in the flowchart of FIG. 6 in the first example, SA2 and SA3 may be switched in the order of execution and, for example, SA2 may be executed after SA3.

When the free-run-time estimated vehicle deceleration GFrd is closer to the free-run-start-time target vehicle deceleration Grdt, the free-run control is more easily provided in the first example; however, whether the free-run control is more easily provided in this way can be determined with various determining methods. For example, when the vehicle 8 runs on running roads having different gradients at least on the same vehicle speed condition, if the number of times of provision of the free-run control increases as the difference (vehicle deceleration difference DGrd) between the free-run-time estimated vehicle deceleration GFrd and the free-run-start-time target vehicle deceleration Grdt becomes smaller, it can be determined that the free-run control is more easily provided when the free-run-time estimated vehicle deceleration GFrd is closer to the free-run-start-time target vehicle deceleration Grdt.

The examples described above may be implemented in a mutually combined manner by setting priorities, for example. For example, if the first example and the second example are implemented in a combined manner, when the free-run control is started at SA5 in the flowchart of FIG. 6, the determination of SB1 in the flowchart of FIG. 8 is affirmed.

NOMENCLATURE OF ELEMENTS 8, 200: hybrid vehicle (vehicle)
12: engine
24: drive wheels
58, 160: electronic control device (vehicle running control device)
202: planetary gear device (power connecting/disconnecting device)
MG: electric motor
K0: engine connecting/disconnecting clutch (power connecting/disconnecting device)
MG1: first electric motor (power connecting/disconnecting device)
MG2: second electric motor (electric motor)

The invention claimed is:

1. A vehicle running control device in a vehicle including a power connecting/disconnecting device interrupting power transmission between an engine and drive wheels, the vehicle running control device providing free-run control of interrupting the power transmission with the power connecting/disconnecting device and stopping the engine during inertia running, the vehicle running control device being configured to determine a target vehicle deceleration at the start of the free-run control based on a vehicle speed and to estimate an estimated vehicle deceleration when the free-run control is started, before starting the free-run control, and when the estimated vehicle deceleration is close to the target vehicle deceleration at the start of the free-run control, the free-run control being provided.

2. The vehicle running control device of claim 1, wherein when a difference between the estimated vehicle deceleration and the target vehicle deceleration at the start of the free-run control is smaller than a predefined deceleration difference determination value, the free-run control is provided.

3. The vehicle running control device of claim 1, wherein the estimated vehicle deceleration is estimated based on a gradient of a running road traveled by the vehicle, and wherein the target vehicle deceleration at the start of the free-run control is determined based on the gradient of the running road.

4. The vehicle running control device of claim 3, wherein when a downward gradient of the running road is increased, the target vehicle deceleration at the start of the free-run control is decreased.

5. The vehicle running control device of claim 3, wherein when the running road has an upward gradient, the free-run control is provided.

6. The vehicle running control device of claim 1, wherein whether the free-run control is provided is determined on the assumption that the target vehicle deceleration at the start of the free-run control is a vehicle deceleration before the start of the free-run control during the inertia running.

7. The vehicle running control device of claim 1, wherein the vehicle includes an electric motor generating a vehicle braking force, where when the free-run control is started, the vehicle braking force of the electric motor is controlled such that an actual vehicle deceleration comes closer to a target vehicle deceleration during the free-run control.

* * * * *